C. FÉRY.
SPECTROSCOPE PRISM WITH CURVED SURFACES.
APPLICATION FILED MAY 19, 1910.
1,007,346.
Patented Oct. 31, 1911.
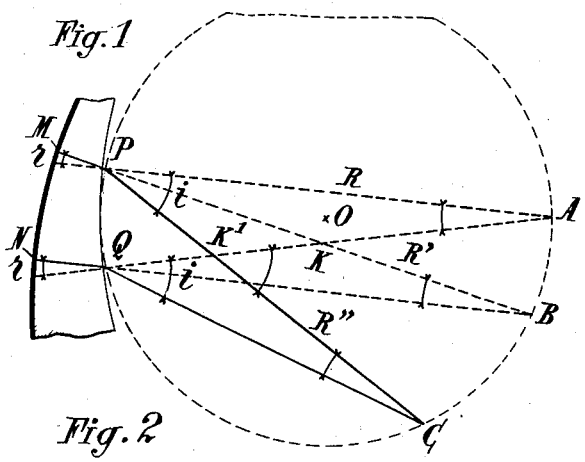
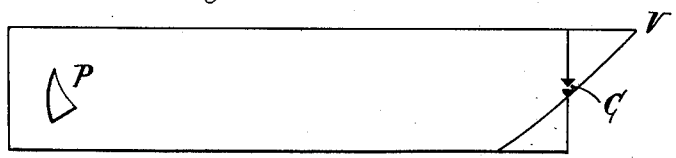
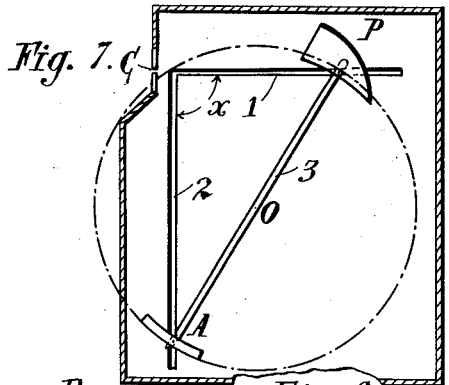
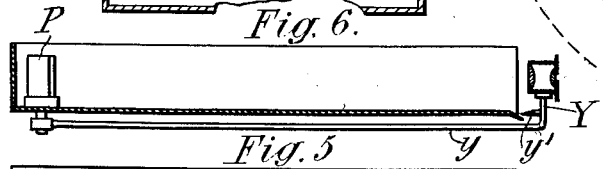
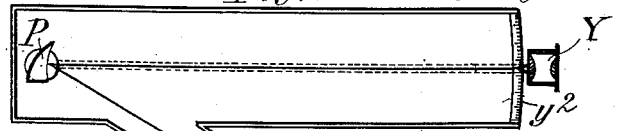
WITNESSES:
Fred White
Rene Bruine
INVENTOR:—
Charles Féry,
By Attorneys,
Fraser, Trask & Myers

UNITED STATES PATENT OFFICE.

CHARLES FÉRY, OF PARIS, FRANCE.

SPECTROSCOPE-PRISM WITH CURVED SURFACES.

1,007,346.  Specification of Letters Patent.  Patented Oct. 31, 1911.

Application filed May 19, 1910. Serial No. 562,310.

*To all whom it may concern:*

Be it known that I, CHARLES FÉRY, a citizen of the Republic of France, residing in Paris, France, have invented certain new and useful Improvements in Spectroscope-Prisms with Curved Surfaces, of which the following is a specification.

In the invention a prism with curved surfaces is used to give a pure spectrum without the aid of any concentrating system, such as convex lenses or concave mirrors and by which the losses of light which occur on entering and leaving the lens by absorption in the lens or by the imperfect reflection at the polished surfaces of the reflecting mirrors are considerably lessened.

Another advantage lies in the simplicity of the apparatus in which the prism is used; the spectroscope consisting only of the prism, the slit and a magnifying glass for the examination of the image; and the spectrograph consists only of the slit, the prism and a frame for holding the photographic plate. The cost of the apparatus is correspondingly lessened. Also the absence of the lenses of the collimator and eye-piece get rid of the parasitical reflections which fog the photographic plate in the ordinary spectrographs.

The invention will be described in connection with the accompanying drawings, wherein—

Figures 1 and 4 illustrate the prism and diagrams of the refractions and reflections therefrom; Fig. 2 illustrates diagrammatically a spectrograph, with my prism applied, in plan; Fig. 3 is an end view of the apparatus illustrated in Fig. 2; Figs. 5 and 6 illustrate diagrammatically in plan and longitudinal section respectively a spectroscope in which my prism is applied; and Fig. 7 illustrates a mounting for the spectrograph or the spectroscope.

The prism is formed (Fig. 1) of two spherical surfaces M N, P Q, of suitable radii of curvature; the one P Q serves for the refraction and dispersion of the rays and the other M N acts as a reflecting mirror. For this purpose the surface M N is silvered or covered with a suitably chosen metallic film of high reflecting power. It is easily shown that the conditions necessary for the production of a pure spectrum can be realized by this system. For let A be the center of curvature of the front surface P Q and let the slit be placed at a point C such that two monochromatic rays C P, C Q coming from the slit make equal angles $i$ with the normals A P and A Q to the spherical surface, then the angles of refraction $r$ which correspond to these equal angles of incidence $i$ will also be equal, since if $n$=index of refraction of the material of the prism $$n = \frac{\sin. i}{\sin. r}.$$

If the refracted rays P M and Q N are produced backward to meet at the point B and this point be taken as the center of curvature of the reflecting surface M N, then the rays falling normally on this face will return on the same path, will undergo a refraction at P and Q of the same amount as on entering the prism and will meet without aberration at the point C.

If there is placed at C a source of monochromatic light, for which the index of refraction $n'$ of the prism is greater than $n$, the angle of refraction $r'$ corresponding to the same constant angle $i$ of incidence will be smaller than $r$ since $$n' = \frac{\sin. i}{\sin. r'} > \left( n = \frac{\sin. i}{\sin. r} \right).$$

The two reflected rays (which to avoid complicating the drawing are not shown) will not be exactly normal to the surface M N, but will meet at a point near C but farther from A; this point also will be a true focus for all rays of this refrangibility coming from C. In this way a spectrum will be formed if the slit is illuminated by a source which is not monochromatic. The spectrum produced in this way will be accurately formed on a cylindrical surface of diameter R, equal to the radius of the front surface of the prism.

It can easily be shown that the angles A, B and C are equal. From the triangles P K′ A and Q K′ C, $$i + A = i + C;$$

hence A=C. From the triangles A K P and B K Q, $$i + A = i + B;$$

hence A=B. The points A, B, C, Q, and P consequently lie on a circle, of which the point $o$ is the center; this will also be true for all points of the spectrum formed in the neighborhood of C. This shows the advantage of the arrangement which renders the spectral curve independent of the law of dispersion of the material used, contrary to what takes place with spectrographs with quartz lenses for instance, where the radius of curvature of the focal surface varies from one part of the spectrum to another. It is easy to calculate the radius of curvature R′ of the reflecting surface M N in terms of the radius R of the refracting surface P Q. If the distance P Q is very small compared to R and R′, $$R' = R \cos. A P B = R \cos. r.$$

If R″ is the radius of the focal curve $$R'' = R \cos. i.$$

The angles $i$ and $r$ (the latter is also equal to the angle of the prism) are connected by the expression $$\sin. i = n \sin. r.$$

The diagrammatic Figs. 2 and 3 show a spectrograph constructed with the curved prism. Fig. 2 is a plan and Fig. 3 a back view. The apparatus consists simply of a rectangular box on which is placed at one end the prism P and at the other end the slit C and a curved frame X holding a plate or a photographic film stretched on a cylindrical frame. If the radius of curvature is small a cylindrical frame and a film should be used. With prisms of small angle and great focal length and focal surfaces of large radius of curvature, the ordinary photographic plate would coincide practically with the focal curve. The two edges of the slit C are adjusted by means of a screw $v$ and the photographic frame X on which the image V V of the spectrum is formed is placed below the slit C.

If it is desired to use the apparatus as a spectroscope, the photographic frame is replaced by a metallic plate carrying an ordinary magnifying glass to facilitate the examination of the rays of the spectrum.

The arrangement shown in Fig. 1 is known in optics as an auto-collimator, the rays coming from the slit C returning on the same path after undergoing a normal reflection at the points M and N. There are two drawbacks associated with this arrangement; in the first place the spectrum (which lies on the circle passing through the points A, B, C, P, Q,) is inclined to the axis of the pencil coming from the prism and so necessitates placing the plate in an oblique direction V V (Fig. 2) with respect to the axis of the apparatus. In the second place, the slit must be placed at C above the frame V V in Fig. 3. These drawbacks are obviated by the different path given to the rays as shown in Fig. 4. A P is the radius of curvature of the first surface, B M that of the second. The slit is at the point C; as shown above, all the points A, B, C, P, and Q lie on a circle of diameter A P. By suitably choosing the point C the ray which undergoes refraction at Q may after reflection at M emerge normally to the first surface at P. Under these conditions the spectrum will be formed in the neighborhood of the point A and the photographic plate will be normal to the pencil coming from the prism. Also the slit will be placed at the side of the apparatus at the point C, the spectrum being received at the point A upon an eye-piece or on a frame of large radius of curvature, or even plane, since if the distance P V is sufficiently great, the curvature may be negligible.

In Figs. 5 and 6 the invention is illustrated as embodied in a spectroscope, the spectroscope being constructed according to the plan of Fig. 4. The image can be examined by an eye-piece Y fixed to an arm $y$ pivoted below the prism P. An index $y'$ moving over a graduated scale $y^2$ will allow in this case wave lengths of the rays examined to be easily determined. Light is admitted through a slit formed at C. When long focus prisms are used, the prism P and the plate or the eye-piece A may be placed at the ends of a rod 3 of fixed length A P, these ends sliding in two guides or grooves 1 and 2 in a suitable base or platform at a right angle to each other. Under these circumstances the image will always be in focus, the points P, C and A being the angular points of a right angled triangle inscribed in the circle of which A P is the diameter.

Having now particularly described and ascertained the nature of my said invention and in what manner the same is to be performed, I declare that what I claim is:

1. A prism for use in forming a spectrum, comprising a transparent body having two curved surfaces, one of which serves for refraction and dispersion of rays, and the other as a reflecting mirror for the refracted rays.

2. A prism for use in forming a spectrum, comprising a transparent body having two curved surfaces, one of which serves for refraction and dispersion of rays, and the other of which is provided with a reflecting means for reflecting the refracted rays.

3. A prism for use in forming a spectrum, comprising a transparent body having two curved surfaces, one of which serves for refraction and dispersion of rays, and the other as a reflecting mirror for the refracted rays, the said second surface being adapted to reflect said refracted rays without refraction thereby.

4. A prism for use in forming a spectrum, comprising a transparent body having two curved surfaces, one of which serves for refraction and dispersion of rays, and the other as a reflecting mirror for the refracted rays, the said prism being adapted to reflect said refracted rays, and to refract said reflected rays at the refracting surface.

5. A spectroscope or like instrument, comprising a part having a slit therein for passage of rays, a part on which the spectrum is projected, and a prism comprising a transparent body having two curved surfaces, one of which serves for refraction and dispersion of rays, and the other as a reflecting mirror for the refracted rays, the centers of the refracting and reflecting surfaces of said prism, the slit for admission of rays and the part on which the spectrum is formed all lying on the circumference of one circle.

6. A spectroscope or like instrument, comprising a part having a slit therein for passage of rays, a sensitized plate upon which the spectrum is projected, and a prism comprising a transparent body having two curved surfaces, one of which serves for refraction and dispersion of rays, and the other as a reflecting mirror for the refracted rays, the centers of the refracting and reflecting surfaces of said prism, the slit for admission of rays and the sensitized plate, all lying on the circumference of one circle.

7. A spectroscope or like instrument, comprising a part having a slit therein for passage of rays, an eyepiece upon which the spectrum is projected, and a prism comprising a transparent body having two curved surfaces, one of which serves for refraction and dispersion of rays, and the other as a reflecting mirror for the refracted rays, the centers of the refracting and reflecting surfaces of said prism, the slit for admission of rays and the eyepiece all lying on the circumference of one circle.

8. A spectroscope or like instrument, comprising a part having a slit therein for passage of rays, a prism comprising a transparent body having two curved surfaces, one of which serves for refraction and dispersion of rays, and the other as a reflecting mirror for the refracted rays, the said refracted rays being reflected from said second surface without refraction, and a part on which the spectrum is projected, said part being located adjacent the center of curvature of the refracting surface of the prism.

9. A spectroscope or like instrument, comprising a part having a slit therein for passage of rays, a prism comprising a transparent body having two curved surfaces, one of which serves for refraction and dispersion of rays, and the other as a reflecting mirror for the refracted rays, the said refracted rays being reflected from said second surface without refraction, and a sensitized plate upon which the spectrum is adapted to be projected, said plate being located adjacent the center of curvature of the refracting surface of the prism and at right angles to the rays reflected from said reflecting surface.

10. A spectroscope or like instrument, comprising a part having a slit therein for passage of rays, a prism comprising a transparent body having two curved surfaces, one of which serves for refraction and dispersion of rays, and the other as a reflecting mirror for the refracted rays, the said refracted rays being reflected from said second surface without refraction, an eyepiece pivoted to the instrument, upon which the spectrum is adapted to be projected, said eyepiece being located adjacent the center of curvature of the refracting surface of the prism and a movable index with a fixed graduated arc for determining the wave lengths of the rays.

11. A spectroscope or like instrument, comprising a surface on which a spectrum is adapted to be projected and a prism comprising a transparent body having two curved surfaces, one of which serves for refraction and dispersion of rays, and the other as a reflecting mirror for the refracted rays said spectrum-surface and prism being mounted opposite one another on a frame movable in guides at right angles to one another.

In witness whereof, I have hereunto signed my name in the presence of two subscribing witnesses.

CHARLES FÉRY.

Witnesses:
H. C. COXE,
RENÉ BARDY.